April 30, 1968  E. PLUMAT ET AL  3,381,078
ELECTRODE DEVICE FOR ELECTRIC FURNACES
Filed Feb. 4, 1966  2 Sheets-Sheet 1

INVENTORS
Emile Plumat &
Alfred Jacobs
BY Spencer & Kaye
ATTORNEYS

INVENTORS
Emile Plumat &
Alfred Jacobs
BY Spencer & Kaye
ATTORNEYS

United States Patent Office 3,381,078
Patented Apr. 30, 1968

3,381,078
ELECTRODE DEVICE FOR ELECTRIC FURNACES
Emile Plumat, Gilly, and Alfred Jacobs, Montignies-sur-Sambre, Belgium, assignors to Glaverbel S.A., Brussels, Belgium
Filed Feb. 4, 1966, Ser. No. 525,022
Claims priority, application Luxembourg, Mar. 12, 1965, 48,186
9 Claims. (Cl. 13—6)

The present invention relates generally to the heating art, and, more particularly to a device used as an electrode for an electrically heated melting furnace.

Of the many techniques used for electrically heating the contents of melting furnaces, the most commonly known technique is one wherein solid electrodes are inserted through the wall of the furnace and are immersed in the material to be melted. The electrodes of this type used in the glass-making industry are generally made of a material which is highly heat resistant and which is not subjected to corrosion by the melted glass. Such electrode materials are molybdenum, tungsten, carbon, etc. Electrodes in this form often present major inconveniences when they react with the glass being melted. This often occurs, for example, when leaded crystal glass is melted with the aid of molybdenum electrodes.

In order to avoid such inconveniences, it has already been suggested to utilize electrodes made of a liquid metal which does not react upon the glass. The electrodes, which may be made of lead or tin are generally contained in the furnace in pockets made of refractory material which are arranged to permit the surface of each liquid metal electrode to be brought into contact with the molten glass contained in the furnace. When liquid electrodes are used, it is a common practice to enclose the pockets of refractory material with a surrounding metal envelope which serves to prevent the escape of liquid metal if cracks should develop in the refractory material. These metal envelopes can also be used for providing a good electrical contact between the molten metal electrode and the conductor feeding electrical current thereto. Generally, two or more electrodes of this type are disposed around the periphery of the tank constituting the furnace and containing the molten glass, these electrodes being disposed at the bottom of the tank.

According to another well known technique, the pocket of refractory material is disposed in such a way that the surface of the liquid metal contained therein is higher than the bottom of the melting tank. In these arrangements, the pockets containing the liquid metal are separated from the main portion of the tank by means of ledges over which the molten glass flows from the central portion of the tank into the pockets in order to come into contact with the liquid metal.

The placing of the masses of liquid metal so that their surfaces are higher than the bottom of the furnace tank serves to reduce the pressure exerted by the molten glass on the liquid metal and thus to eliminate the losses of liquid metal through leakage around the edges of the metal envelopes.

Although both of the arrangements described above produce satisfactory results, they each have at least one serious drawback. This is due to the fact that all of the electric current which is supplied to the molten mass must of necessity pass through the molten glass which is just above the liquid metal in the first-described arrangement or through the molten glass situated just above the ledges separating the main portion of the tank from the pockets of liquid metal in the second-described embodiment. Moreover, since the thickness of the molten glass layer above the ledge in the second-described arrangement is preferably maintained at a small value in order to prevent the fluid pressure on the liquid metal from exceeding an acceptable value, and increase in the intensity of the electric current passing through the molten bath will cause the glass to be overheated and to thereby cause a rapid wearing away of the refractory wall material located in these regions.

It is a primary object of the present invention to eliminate these drawbacks.

It is another object of the present invention to increase the effectiveness of glass melting furnaces.

It is a further object of the present invention to permit larger heating currents to be passed through a molten glass bath while preventing the glass from being overheated in regions where the bath has a reduced cross-sectional area.

These and other objects and improvements are achieved, according to the present invention, by the provision—in combination with an electrically heated furnace having a melting tank for melting a mass of material such as glass—of a plurality of electrodes of novel construction disposed around the periphery of the melting tank. Each of these electrodes is composed of a pocket whose walls are made of refractory material, a mass of liquid metal contained in the pocket for contacting the material to be melted, and electric current supply means conductively connected to the mass of liquid metal. In accordance with a principal novel feature of the present invention, each electrode also includes electrically conductive means made of a material which is different from, and which has a higher electrical conductivity than, the material to be melted. This conductive means is disposed between the mass of liquid metal and the region of the melting tank which is to be occupied by the mass of material to be melted.

The provision of such electrically conductive means, which is preferably constituted by a solid body having the size and shape required to produce an optimum distribution of electric current throughout the mass of material to be melted, permits the amount of current flowing through the mass of material to be increased without producing an undesirable overheating of the material in regions where the cross-sectional area of this mass is reduced, and hence without causing a rapid wearing away of the refractory material adjacent these regions of reduced cross-sectional area.

Additional objects and advantages of the present invention will become apparent upon consideration of the following description when taken in conjunction with the accompanying drawings in which.

Figure 1:
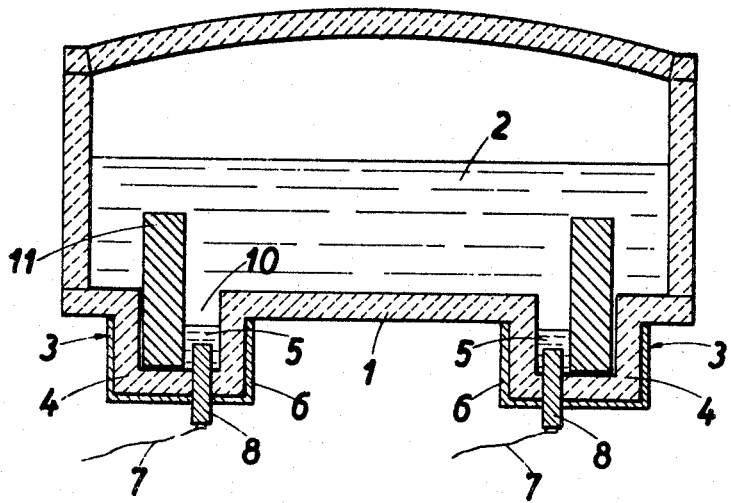
FIGURE 1 is an elevational, cross-sectional view showing an electrically heated melting furnace incorporating a first embodiment of the present invention.

Referring now specifically to FIGURE 1, there is shown a cross-sectional view of an electrically heated glass melting tank forming, for example, one portion of a glass melting furnace having two tanks, in which furnace the material to be melted is introduced into the melting tank and the molten glass is led through a lowered communicating channel into a second tank in which the glass is subjected to further fabrication processes. The melting tank is constituted essentially by a tank 1 made of a refractory material and containing the molten glass 2. Two or more electrodes 3 are distributed around the periphery of the tank bottom and each electrode is constituted by a pocket 4 of refractory material, such as an aluminosilicate or monofax, for example, which is inert with respect to metals present in the liquid state and which contains a liquid metal or a molten alloy 5 constituted by lead or tin, for example. In order to prevent the loss of molten metal if cracks should develop in the pocket walls, the pocket is surrounded by a metal envelope 6.

Figure 2:
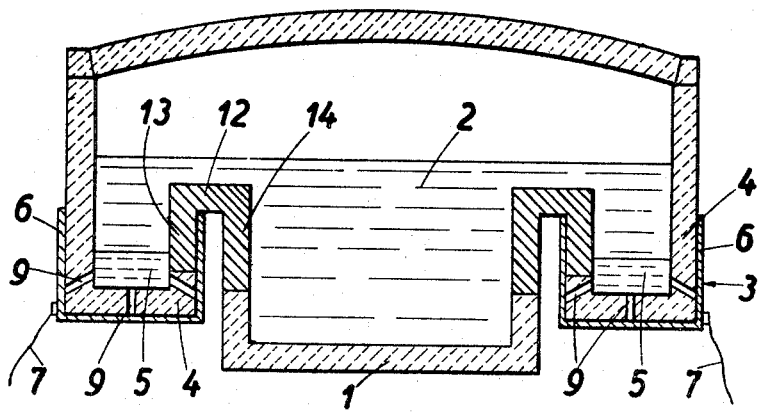
FIGURE 2 is a view similar to that of FIGURE 1 showing another embodiment of the present invention.

In order to provide a good electric contact between the molten metal and a current supply cable 7, there is provided a plug 8 which passes through the refractory wall of the pocket 4 and the envelope 6 and which is immersed in the liquid metal. The electric connection could also be made, as shown in FIGURE 2, by permitting the liquid metal to fill passages 9 formed in the refractory pocket 4 so as to come into contact with the metal envelope 6.

Corrosion of the material envelope 6 by the liquid metal is reduced by intensively cooling this envelope by blowing air or a water spray on its surface.

The structure of FIGURE 1 thus far described has the major drawback that all of the current introduced into the tank must flow through the molten glass disposed in the region 10 just above the masses of molten metal 5. If the current intensity exceeds a certain value, the molten glass in this region 10 will become overheated and will cause a rapid wearing away of the refractory material adjacent thereto.

This drawback is eliminated, in accordance with a principal feature of the present invention, by the provision of conductive means in the form of an electrically conductive connection composed of a solid body 11 made of a material which is a good conductor of electricity and having one portion immersed in the liquid metal 5 and the remaining portion immersed in the mass of molten glass 2 contained in the tank 1. The body 11 is preferably made of a refractory metal oxide such as stannic oxide ($SnO_2$) and acts to provide a lower resistance path than does the molten glass between the liquid metal and the molten glass contained in the major portion of the tank. The provision of these electrically conductive connections permits much larger currents to be passed through the molten glass before the molten glass in the region 10 becomes overheated. The height and shape of the bodies 11 may be varied at will in order to achieve the desired distribution of current throughout the bath.

As is shown in FIGURE 2, the present invention can also be advantageously employed in furnaces in which the several pockets 4 of refractory material are separated from the main portion of the tank 1 by ledges 12 which are made of a refractory material and which are disposed below the surface of the mass of molten glass 2. This arrangement permits the molten glass to flow over the ledges 12 and into the pockets in order to come in contact with the liquid metal 5 contained in the pockets.

Prior art structures of this type had the drawback that a very high current density existed in the shallow layer of molten glass disposed immediately above the ledges 12. As a result, a relatively low current flow caused the current density through these shallow portions of the molten glass mass to exceed a permissible value so that the glass became overheated and caused a rapid wearing away of the ledges.

In order to overcome this drawback the prior art structure is modified in accordance with the present invention by making the ledge 12, as well as the adjacent wall portion 13 of the pocket 4 and the adjacent wall portion 14 of the tank 1, of an electrically conductive refractory metal oxide, such as $SnO_2$, for example, in order to provide an improved electrical connection between the liquid metal 5 and the molten glass contained in the main portion of tank 1.

The height and the shape of the wall portion 14 may be varied at will in order to achieve the desired distribution of electrical current throughout the tank 1.

Figure 3:
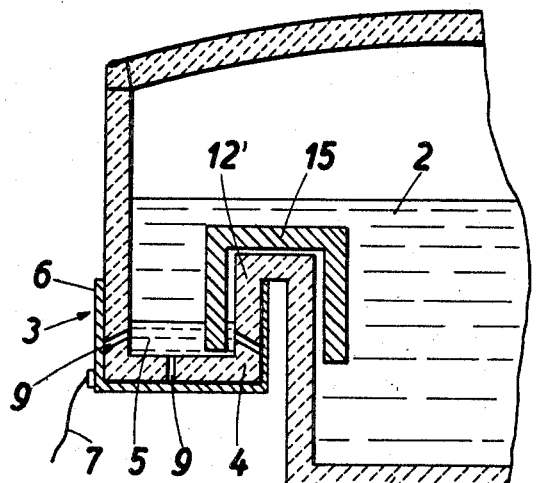
FIGURE 3 is a partial, elevational, cross-sectional view showing yet another embodiment of the present invention.

Referring now to FIGURE 3, there is shown an arrangement for modifying existing prior art tanks in accordance with the present invention. In this arrangement, the ledge 12' of the prior art tank is made of a refractory material which is identical with the material of the remainder of tank 1 and pocket 4 and which has a relatively low conductivity. In order to eliminate the drawbacks previously presented by this form of construction, an electrically conductive connection is provided between the liquid metal 5 and the molten glass in tank 1 in the form of an inverted U-piece 15 straddling the ledge 12'. One of the vertical arms of the piece 15 is immersed in the liquid metal 5, while the other vertical branch thereof is disposed along a vertical wall of the main portion of tank 1. As in the previous embodiments, the piece 15 is made of an electrically conductive refractory metal oxide such as $SnO_2$. The height and/or shape of the vertical arm of piece 15 which is disposed in the main portion of tank 1 may be varied at will in order to achieve the desired distribution of current throughout the tank.

Figure 4:
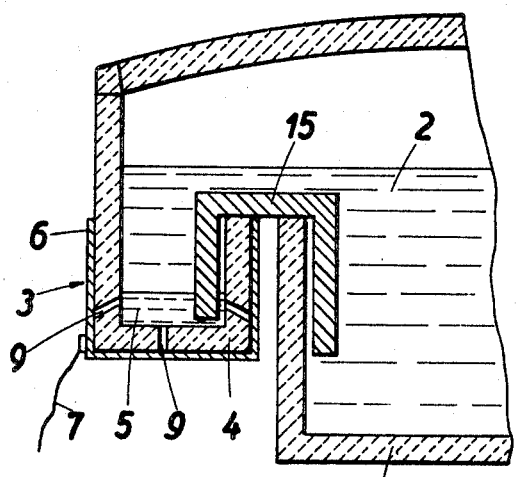
FIGURE 4 is a view similar to that of FIGURE 3 showing still another embodiment of the present invention.

FIGURE 4 shows yet another embodiment of the present invention which is substantially similar to that of FIGURE 3. In this case, however, the horizontal portion of the piece 15 constitutes the ledge separating the tank 1 from the refractory pocket 4. This structure may be employed in an existing furnace whose original ledge has become worn away and would otherwise require replacement.

It may thus be seen that the novel features of the present invention are embodied in several preferred forms of construction:

In a first form of construction according to the present invention, the liquid metal is placed at the bottom of the tank and the electrically conductive means is constituted by a conductive element which has one portion immersed in the liquid metal and the remaining portion immersed in the molten glass bath.

In a second type of construction according to the present invention, which construction is also of a type which is widely used in the glass-making industry, the liquid metal is separated from the central portion of the melting tank by a ledge and the electrically conductive means is preferably constituted by this ledge and by portions of the wall of the pocket and the furnace tank adjacent to this ledge.

Concerning this second form of construction, if it is desired to apply the present invention to an existing furnace, the electrically conductive connection can advantageously be constituted by a piece having the form of an inverted U one vertical arm of which is immersed in the liquid metal contained in the pocket and the other vertical arm of which is immersed in the molten glass bath contained in the central portion of the tank, while the horizontal portion of the conductive element is disposed below the surface of the molten material.

In another form of construction according to the present invention, an inverted U-shaped piece is provided and is arranged so that its horizontal portion constitutes the ledge separating the refractory pocket from the central portion of the tank.

An additional advantage presented by the present invention is that the portion of the electrically conductive means which is in contact with the mass of molten glass permits the electric current to be distributed throughout various depths in the tank so as to cause ideal heating conditions to be created in the melting and refining zones of the furnace.

Such a result can not be achieved in electrically heated furnaces according to the prior art because the greatest part of the electric current is there concentrated at certain locations in the molten mass contained in the tank. The improved results achieved by the present invention can be augmented, according to another novel feature thereof, by giving the electrically conductive means which is immersed in the tank, or which forms a part thereof, lengths, shapes, and cross-sections which are so chosen as to distribute the current in the molten glass mass in a well-determined manner.

The material from which the electrically conductive connection is formed is preferably a refractory metal oxide which does not react with the glass, one such material being stannic oxide, for example.

It should also be noted that the arrangement according to the present invention offers another advantage over the prior art arrangements, wherein a solid electrode of stannic oxide is arranged to pass through the wall of the surface, because the arrangement according to the present invention eliminates the problems previously encountered when connecting the electrode to the conductor supplying electric current.

It will be understood that the above description of the present invention is susceptible to various modifications, changes, and adaptations, and the same are intended to be comprehended within the meaning and range of equivalents of the appended claims.

What is claimed is:

1. In combination with an electrically heated furnace having a melting tank for melting a mass of material, a plurality of electrodes disposed around the periphery of the melting tank, each of said electrodes comprising:
   (a) a pocket whose walls are made of refractory material;
   (b) a mass of liquid metal contained in said pocket for contacting the material to be melted;
   (c) electric current supply means conductively connected to said mass of liquid metal; and
   (d) electrically conductive means made of a material which is different from, and which has a higher electrical conductivity than, the material to be melted, said conductive means being disposed between said mass of liquid metal and the region of the melting tank which is to be occupied by the mass of material to be melted.

2. An arrangement as defined in claim 1 wherein said electrically conductive means has one portion immersed in said mass of liquid metal and its remaining portion disposed in the region of the melting tank which is to be occupied by the mass of material to be melted.

3. An arrangement as defined in claim 1 wherein the melting tank has a main portion for containing the major part of the mass of material to be melted, said electrodes are spaced about the periphery of the main tank portion and are each separated therefrom by a ledge over which the mass of material can flow in order to come in contact with said mass of liquid metal, and said electrically conductive means is constituted by a body of refractory material which is arranged to constitute the ledge and to form a portion of the wall defining the main portion of the tank and a portion of the wall of said pocket.

4. An arrangement as defined in claim 1 wherein the melting tank has a main portion for containing the major part of the mass of material to be melted, said electrodes are disposed about the periphery of the main portion of the tank and are separated therefrom by a ledge over which the mass of material can flow to come in contact with said mass of liquid metal, and said electrically conductive means is constituted by a body of refractory material having the form of an inverted U one vertical arm of which is immersed in said mass liquid metal and the other vertical arm of which is disposed in a region of the main portion of the tank which is to be occupied by the mass of material to be melted.

5. An arrangement as defined in claim 4 wherein the horizontal portion of said U-shaped body is disposed below the level of the surface of the mass of material to be melted.

6. An arrangement as defined in claim 1 wherein said electrically conductive means is constituted by a body whose length, shape and cross-sectional area are selected to cause electric current flowing through the mass of material to be melted to be distributed throughout the tank in a predetermined manner.

7. An arrangement as defined in claim 1 wherein said electrically conductive means is made of a refractory metal oxide which is inert with respect to the material to be melted.

8. An arrangement as defined in claim 7 wherein said electrically conductive means is made of stannic oxide.

9. An arrangement as defined in claim 5 wherein said horizontal portion of said U-shaped body constitutes the ledge separating said electrode from the main portion of the tank.

References Cited

UNITED STATES PATENTS

| | | | |
|---|---|---|---|
| 2,014,615 | 9/1935 | Ferguson | 13—6 |
| 2,018,884 | 10/1935 | Ferguson | 13—6 |

BERNARD A. GILHEANY, *Primary Examiner.*

H. B. GILSON, *Assistant Examiner.*